US006273234B1

(12) United States Patent
Balzer-Apke et al.

(10) Patent No.: US 6,273,234 B1
(45) Date of Patent: Aug. 14, 2001

(54) BRAKING DEVICE AND METHOD OF BRAKING MOVING PAVEMENTS RESPECTIVELY ESCALATORS

(75) Inventors: Ludwig Balzer-Apke, Velbert; Dirk Lange, Dortmund, both of (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/628,414

(22) Filed: Jul. 28, 2000

Related U.S. Application Data

(63) Continuation of application No. PCT/EP99/00230, filed on Jan. 16, 1999.

(30) Foreign Application Priority Data

Feb. 2, 1998 (DE) ............................................. 198 03 899

(51) Int. Cl.[7] ..................................................... B65G 43/00
(52) U.S. Cl. ............................................ 198/323; 198/330
(58) Field of Search .................................... 198/322, 323, 198/330

(56) References Cited

U.S. PATENT DOCUMENTS 3,896,925 * 7/1975 Mitsui et al. ........................ 198/323
4,588,065 5/1986 Maiden et al. .
4,631,467 * 12/1986 Herrmann et al. .................. 198/330
6,049,189 * 4/2000 Markus et al. ....................... 198/322

FOREIGN PATENT DOCUMENTS 35 09 207 9/1985 (DE) .
0 557 570 9/1993 (EP) .
2 464 912 3/1981 (FR) .
2 156 173 10/1985 (GB) .

OTHER PUBLICATIONS

English Language Abstract of JP 8–161532 filed Jun. 21, 1996.

* cited by examiner

*Primary Examiner*—Joseph E. Valenza
(74) *Attorney, Agent, or Firm*—Venable; Robert Kinberg

(57) ABSTRACT

The invention relates to a method for load-independently braking the step or pallet belt of an escalator or a moving walkway. According to said method, the activation of at least one safety element triggers at least one frequency converter in such a way as to activate a time-dependent braking ramp, said frequency converter interacting with the drive motor. The braking ramp then slows down the step or pallet belt to 0 m/s with essentially constant deceleration.

Figure 1:
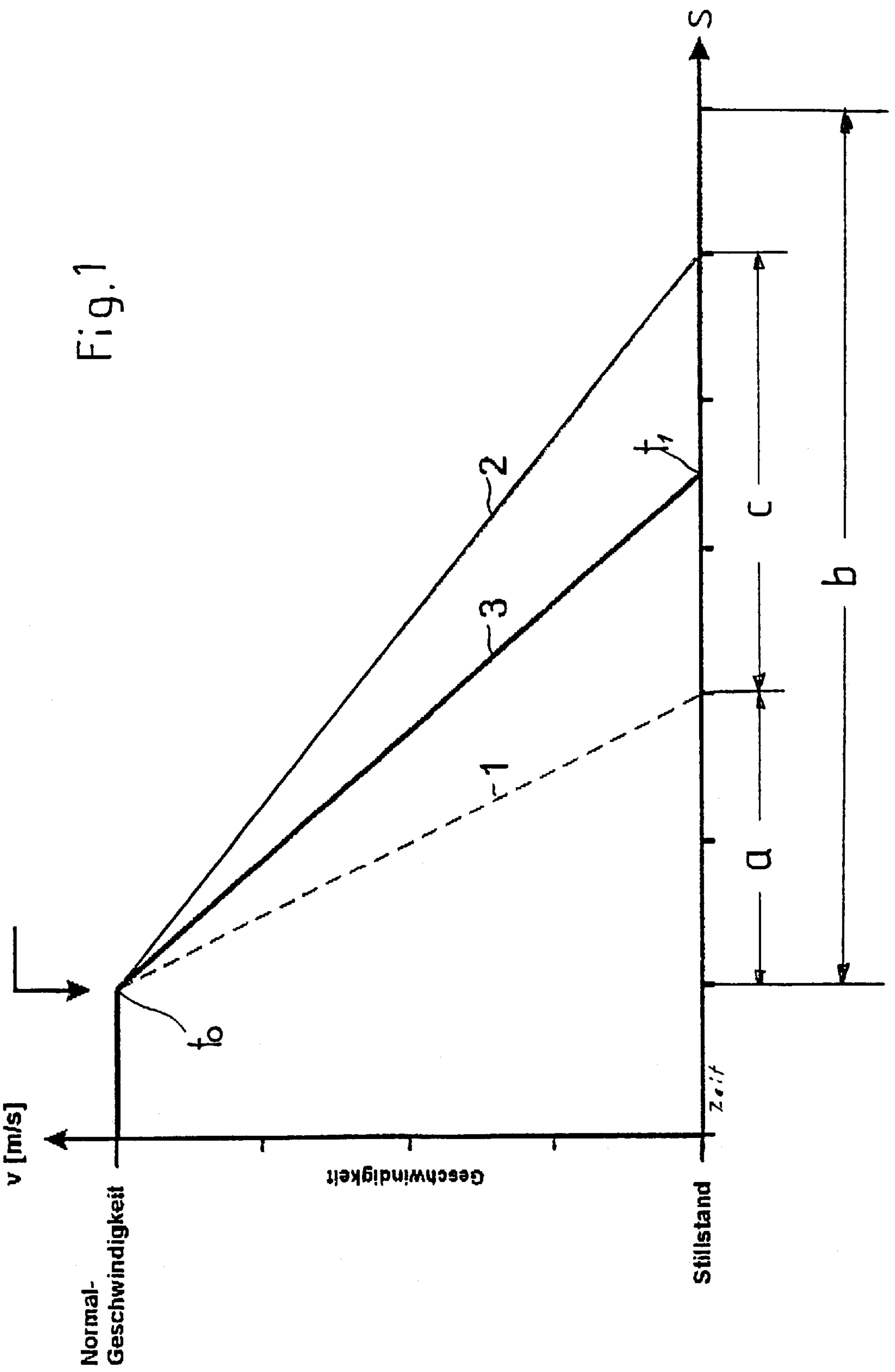

8 Claims, 3 Drawing Sheets v [m/s]
s
Normal-Geschwindigkeit
Geschwindigkeit
Stillstand
Zeit
$t_0$
$t_1$
1
2
3
a
b
c

BRAKING DEVICE AND METHOD OF BRAKING MOVING PAVEMENTS RESPECTIVELY ESCALATORS

This application is a continuation of PCT/EP99/00230, with an international filing date of Jan. 16, 1999, the disclosure of which is incorporated herein by reference. Priority is claimed in the parent PCT application as well as in the present application with respect to German Application No. 198 03 899.2 filed Feb. 2, 1998 filed in the German Patent Office, the disclosure of which is incorporated herein by reference.

The invention relates to a method of load independent braking of the stair respectively pallet band of an escalator respectively a moving pavement according to the generic part of the first claim.

For braking the stair respectively pallet band of an escalator at response of safety elements essentially mechanically or electro-mechanically-operable brakes, in particular block brakes, have been used so far. As a rule these brakes are spring-loaded, wherein the action of the spring is compensated by a magnet coil, so that the brake remains open in operating state. While stopping the escalator respectively the moving pavement the action of the electromagnet is compensated and thereby it is then made use of the prevailing spring power. If there is a power outage, the mechanical brake immediately acts, since the action of the electromagnet is immediately compensated and the spring power can be activated then. Herein usually the centrifugal mass at the motor is simultaneously used as a brake drum, wherein the centrifugal mass, which has to be calculated dependent on the dimensions of the escalator respectively the moving pavement, causes the stopping distance to remain within the given limits. Substantial criteria of the calculation of the centrifugal mass are for escalators the load caused by the number of persons and for moving pavements essentially the length in connection with the passenger load being located thereon.

When the brake acts, the drive motor is cut off from the power supply. Herein the brake will be released, if the emergency stop is actuated as well as if safety switches in the existing safety chain respond.

The known brake has the disadvantages that the stopping distance is load dependent, that no equal stopping distances can be obtained—since they are load dependent—, and that with special constructional conditions (e.g. overlength of moving pavements) such high centrifugal masses are required, that technical limits for the accommodation have been reached herein. Furthermore, a relatively high wear of the brake lining is given, which, due to safety reasons, makes a continuous adjustment of the mechanical brakes necessary.

GB-A 2156173 relates to a method as well as an apparatus for braking a passenger conveyor. The movement of the passenger conveyor shall be essentially braked in a load independent and transport direction independent way. A motor-tachogenerator is used, which measures the retardations, whereby the trigger current of the drive motor is modified. Direct-current is applied to the windings of an A.C. drive motor, whereby an electrodynamic brake effect is achieved in such a way, that a previously determinable braking behaviour of the passenger conveyor is induced via the motor.

From EP-A 557 570 a braking device, in particular for a crane, is known. The same one comprises a drive motor and a brake, wherein the motor is monitored by means of microprocessors. A monitoring device checks the microprocessor on eventual brake failures. Finally an application device is provided which applies the brake, when a breakdown of the microprocessor has been detected.

It is the aim of the subject of invention to provide a different kind of braking method on the one hand and a braking device differing from the state of the art, which is no more load dependent and mostly resistant to wear, on the other hand, in order to increase safety and observe the stopping distances (downwards and upwards) required by the relevant norms as well as to reduce the mechanical requirement (centrifugal masses).

On the one hand this aim is achieved by the characterizing features of the first claim.

Advantageous embodiments of the method according to the invention are disclosed in the associated subclaims.

On the other hand the aim is also achieved by the features disclosed in the characterizing part of the objective secondary claim.

Advantageous embodiments of the braking device according to the invention are disclosed in the associated subclaims.

By means of the method according to the invention as well as the braking device according to the invention a load independent braking of the stair respectively pallet band of escalators and moving pavements is carried out in comparison to the actual state of the art, which substantially offers the following advantages:

- always equal stopping distances, since independent from the load
- resistance to wear of the service brake
- low mechanical requirement (reduction of the centrifugal masses to zero)
- increase of safety
- at least partly energy recycling into the supply system Thus the invention provides for the use of an exclusively electrically active service brake. Herein the contacts of the main control elements (contactors) of the motor circuit are maintained closed for braking the escalator respectively the moving pavement, although the safety chain has been interrupted by releasing one or more safety elements.

By means of the embodiments according to the invention it is assured, that the additional brake is surely applied, if error functions of the frequency converter occur, and after the escalator has been stopped. A potential voltage loss has to be considered as a breakdown of the service brake, i.e. the additional brake has to be activated by a monitoring of the distribution voltage or it has to be applied automatically at once.

Preferably all the disconnecting contacts in a path of the current act on two, in particular parallel connected contactors (redundancy), which both cause the drive of the main control elements during the braking operation of the frequency converter and provide, in case of deviations, for the immediate application of the additional brake.

An additional safety device can then assure, that the additional brake is applied in any case (e.g. via two separate time relays) after a certain period of time, which has to be fixed yet, has run out. In case the time relays and/or the monitoring contacts do not function correctly, an evaluation with error alarm and connecting lock will be carried out.

By means of the method according to the invention respectively the braking device according to the invention the speed of the escalator respectively the moving pavement can thus be decreased to the value of 0 m/s in a defined way with substantially constant retardation. At the moment of standstill of the stair respectively pallet band (rotary frequency =0 or 0 Hz) the mechanical brake acts as a holding brake. At the moment of release of a safety element the brake ramp of the frequency converter is activated and braked in a uniformly retarded way while observing the stopping distance required in the corresponding regulations.

If the desired curve of the brake ramp of the frequency converter is exceeded in case of breakdown, it will be assured by immediate application of the additional brake, that the stopping distance is observed. As criteria for the premature application the deviation from the given ramp is taken. The evaluation is preferably carried out by a microprocessor in the electronic control of the escalator respectively the moving pavement.

If both the frequency converter and the electronic control receive false information, which cause the speed of the motor not to be reduced respectively the motor not to pass through the given brake ramp, the brake must be applied and the frequency converter has to be separated from the motor connection at the latest after running out of the monitoring time.

By means of the safety measures according to the invention the following diversitary system could be formed, by which the brake can be controlled in a defined way and surely applied:

evaluation respectively control of the motor speed via the frequency converter for the load independent reduction of the speed of the escalator respectively the moving pavement and release of the additional brake approximately at a motor speed of zero evaluation of the speed pulses with evaluation via electronic control for releasing the brake at the motor speed of zero capacitor short-time relays or pneumatic relay control elements for an absolute application of the additional brake after running out of a time ramp.

The subject of invention is represented by means of an example of embodiment in the drawing and will be described as follows. It is shown in FIG. 1—a graphical representation of the speed behaviour during the braking of an escalator respectively a moving pavement as comparison of the state of the art to the subject of invention FIG. 2—a representation on principle of a frequency converter controlled service brake of a drive motor of a not further represented escalator FIG. 3—a representation on principle of a frequency converter controlled service brake completed by safety elements for a not further represented moving pavement.

The diagram represented in FIG. 1 shows the actual state of the art with electro-mechanical block brake as service brake on the one hand and the safety oriented braking via frequency converter on the other hand. Region a is the minimum stopping distance defined in the current regulations, whereas b defines the maximum acceptable stopping distance. The reference numerals 1 and 2 in connection with c define the spread between the minimum stopping distance a and the maximum stopping distance b, which can be achieved by the load dependent functioning electro-mechanical brake.

With reference numeral 3 the safety oriented braking via frequency converter with/without load is indicated, wherein by load independent braking a defined stopping distance over a given time is always realisable (brake ramp). The speed of the moving pavement respectively the escalator is thus decreased to the value of 0 m/s in a defined way with constant retardation. At the moment $t_0$ the brake ramp of the frequency converter is activated and substantially uniformly braked in a retarded way, while observing the required stopping distance. At the moment $t_1$ the standstill has been reached and a here not further represented standstill brake (additional brake) is applied.

Figure 2:
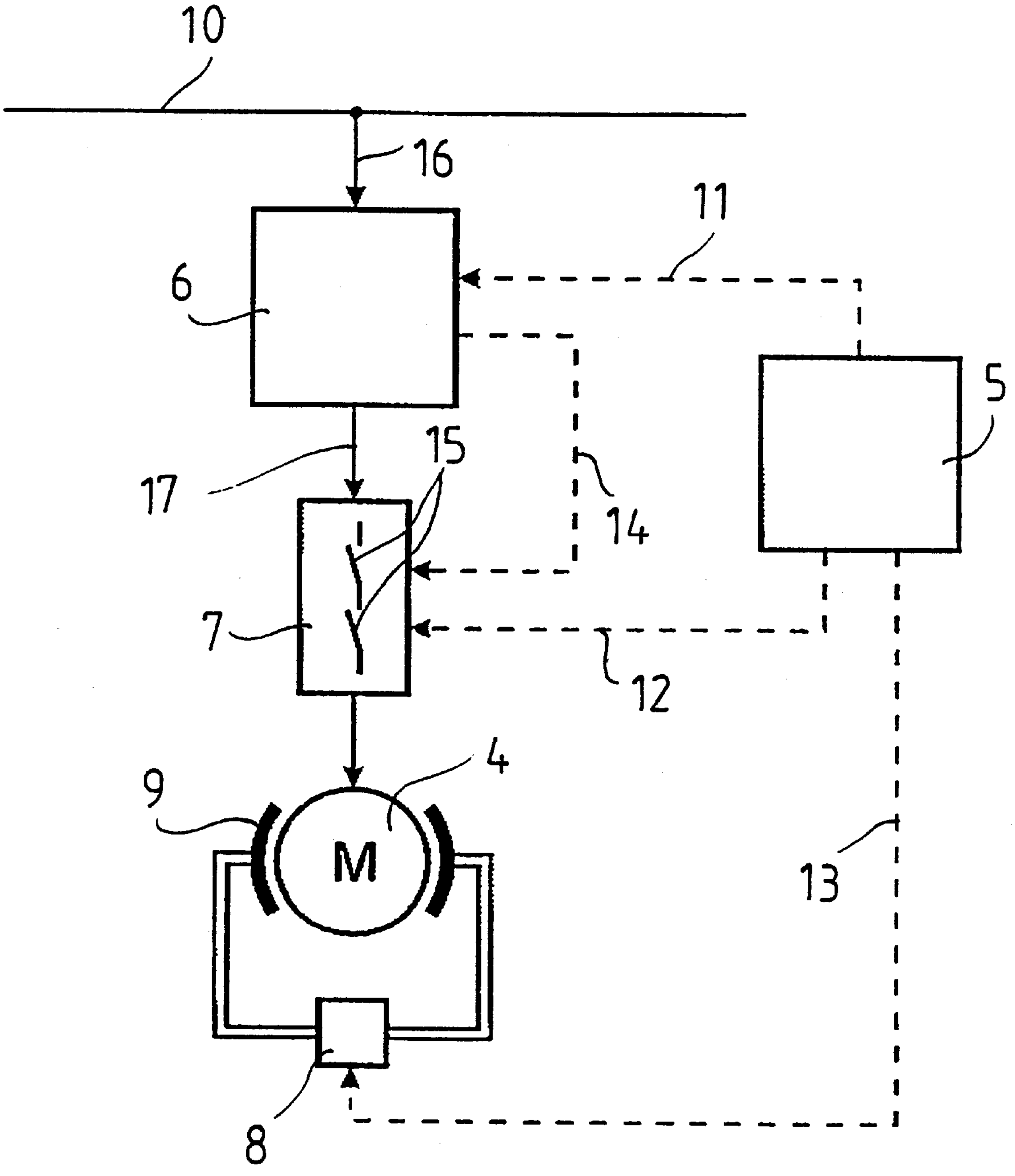

FIG. 2 shows a diagram on principle of the braking operation via a frequency converter, wherein the following elements can be seen:

the drive motor 4 of a not further represented escalator, an electric or electronic control 5, a frequency converter 6, a cut off element 7, a brake magnet 8 for an electro-mechanical additional brake 9 (standstill brake) in form of a block brake. Herein the energy flow is shown in full lines, while the control signals are indicated in dotted lines. With reference numeral 10 the energy supply is indicated. The electric respectively electronic control 5 of the frequency converter 6 and the cut off element 7 is realised via control lines 11, 12, 13 on the one hand and of the brake magnet 8 via active connection on the other hand. Via control line 14 the frequency converter 6 is connected to the cut off element 7. The contacts 15 of the cut off element 7 have to be maintained closed for braking the escalator, although the here not further represented safely chain is interrupted. Herewith a current conduction through the lines 16, 17, 18 to the drive motor 4 is assured, so that the frequency converter 6 can act on the drive motor 4 at any time, independent from the fact, whether the safety chain has been interrupted at any site. With 9 the mechanical additional brake is indicated, which—looking back at the diagram according to FIG. 1—is applied at the moment $t_1$, i.e. in standstill respectively relative standstill, and enters in active connection with here not further represented elements of the drive motor 4.

Figure 3:
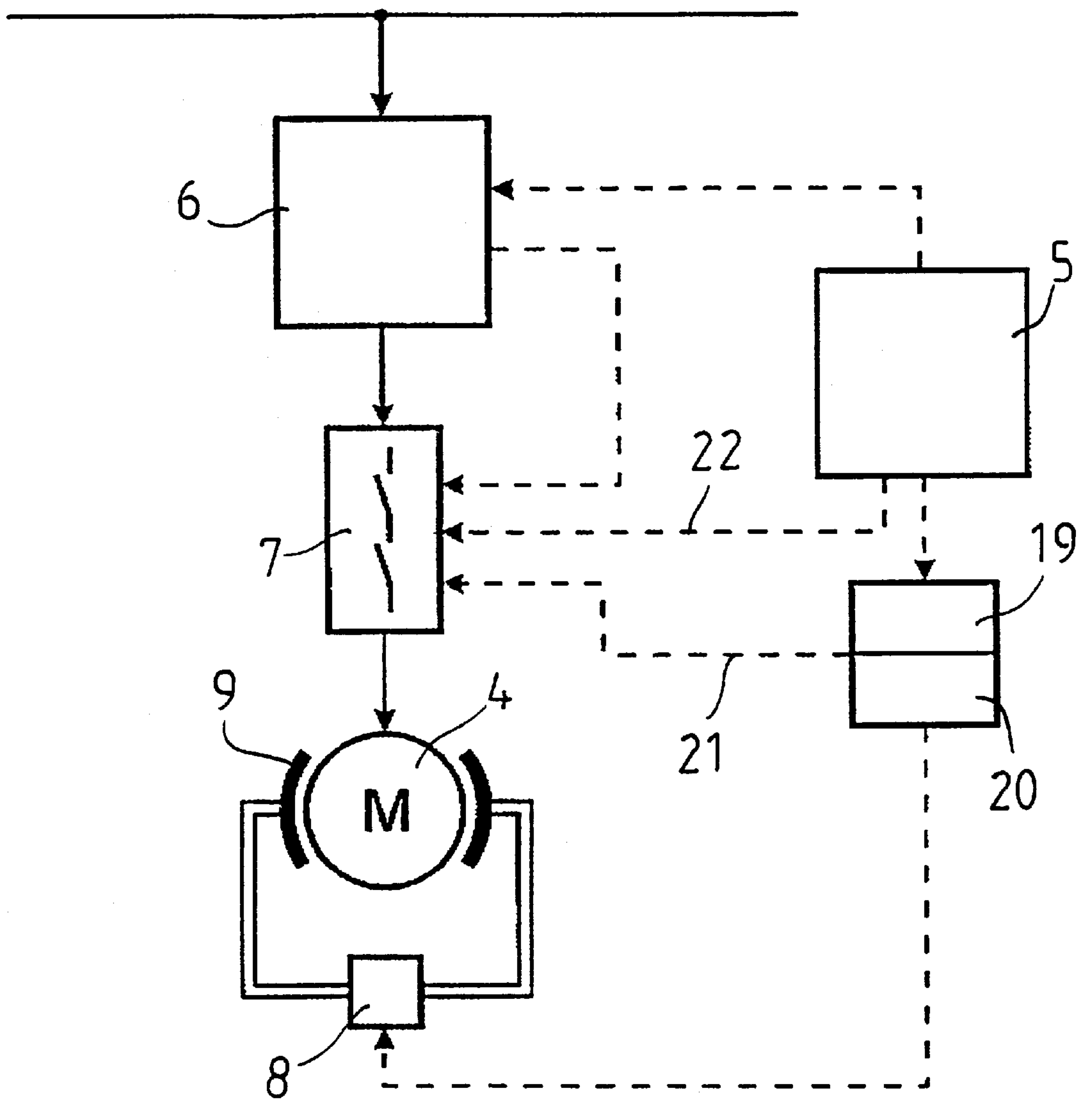

FIG. 3 shows a braking device, which is substantially equivalent to the one in FIG. 2, with the elements drive motor 4, frequency converter 6, electric respectively electronic control 5, cut off element 7 and brake magnet 8 as well as additional brake 9. Furthermore, further safety elements, namely double mechanical/electric time function elements 19, 20 are provided, which are in turn in active connection with the cut off element 7 via control line 21 and with the electronic control 5 via control line 22. By means of these additional safety elements it is assured that the additional brake 9 is surely applied if error functions of the frequency converter 6 respectively the electronic control 5 occur and after the standstill of the here not further represented moving pavement has been reached. The brake ramp (3) represented in FIG. 1 is constantly monitored on exceeding or undershoot.

What is claimed is:

1. Method of load independent braking of the stair respectively pallet band of an escalator respectively a moving pavement by reducing the speed of the stair respectively pallet band via the drive motor at response of at least one safety element, characterized in that at least one frequency converter (6) cooperating with the drive motor (4) is triggered in such a way, that a time dependent brake ramp (3) is activated, through which the speed (v) of the stair respectively pallet band is decreased to the value of 0 m/s essentially with constant retardation.

2. Method according to claim 1, characterized in that approximately at the moment ($t_1$) of standstill of the stair respectively pallet band a standstill brake (9) is activated.

3. Method according to claim 1, characterized in that the frequency converter (6) is provided as service brake and the standstill brake (9) as safety device for breakdowns in the region of the frequency converter (6) and/or the control (5).

4. Method according to claim 1, characterized in that in case of deviations from the desired curve of the brake ramp (3) the standstill brake (9) is immediately activated observing the maximum stopping distance (b) of the stair respectively pallet band, wherein the evaluation is carried out by a microprocessor provided in the region of the control (5) of the escalator respectively the moving pavement.

5. Method according to claim 1, characterized in that in case of false information both in the region of the frequency converter (6) and the region of the control (5), with a presetable monitoring time, the standstill brake (9) is applied and the frequency converter (6) is separated from the drive motor (4).

6. Load independent braking device for the stair respectively pallet band of an escalator respectively moving pavement, which can be driven by at least one drive motor (4), comprising a service brake (6) and a standstill brake, characterized in that the service brake is formed by at least one frequency converter (6) being in active connection with the drive motor (4), and that the standstill brake (9) is an electro-mechanical brake, in particular a block brake, which can be brought into active connection with elements of the drive motor (4).

7. Device according to claim 6, characterized by additional safety elements (19, 20) for monitoring failures in the region of the frequency converter (6) and/or the control (5) being in active connection with this one.

8. Device according to claim 6, characterized in that the additional safety elements (19, 20) are formed by cut off elements and/or mechanical and/or electronic time function elements.

* * * * *